US008248618B2

(12) United States Patent
Rinn et al.

(10) Patent No.: US 8,248,618 B2
(45) Date of Patent: Aug. 21, 2012

(54) METHOD FOR DETERMINING POSITIONS OF STRUCTURES ON A MASK

(75) Inventors: Klaus Rinn, Heuchelheim (DE); Andreas Schaaf, Mittenaar-Bicken (DE); Andre Schepp, Fermwald (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 319 days.

(21) Appl. No.: 12/689,358

(22) Filed: Jan. 19, 2010

(65) Prior Publication Data
US 2010/0220339 A1  Sep. 2, 2010

(30) Foreign Application Priority Data

Feb. 28, 2009  (DE) .......... 10 2009 003 551

(51) Int. Cl.
*G01B 11/24* (2006.01)
*G06F 17/18* (2006.01)
(52) U.S. Cl. .......... 356/614; 356/601; 702/179
(58) Field of Classification Search .......... 356/601, 356/614, 622–640; 250/548, 491.1; 382/145–152, 382/172; 702/179, 150
See application file for complete search history.

(56) References Cited

U.S. PATENT DOCUMENTS

| 5,572,288 | A | 11/1996 | Mizutani |
| 6,347,458 | B1 | 2/2002 | Kaczynski |
| 6,920,249 | B2 | 7/2005 | Rinn et al. |
| 6,960,755 | B2 | 11/2005 | Kaczynski |
| 7,420,670 | B2 * | 9/2008 | Rinn et al. .......... 356/237.4 |
| 7,584,072 | B2 * | 9/2009 | Fricke et al. .......... 702/150 |
| 7,654,007 | B2 * | 2/2010 | Heiden et al. .......... 33/502 |
| 2002/0196331 | A1 | 12/2002 | Rinn |
| 2003/0201404 | A1 | 10/2003 | Shiraishi |
| 2007/0070336 | A1 * | 3/2007 | Maeda et al. .......... 356/237.2 |
| 2007/0076943 | A1 * | 4/2007 | Wienecke et al. .......... 382/145 |
| 2007/0268496 | A1 * | 11/2007 | Boesser et al. .......... 356/508 |
| 2008/0252903 | A1 * | 10/2008 | Boesser et al. .......... 356/614 |

FOREIGN PATENT DOCUMENTS

| DE | 19858428 A1 | 7/2000 |
| DE | 10047211 A1 | 5/2002 |
| DE | 10106699 A1 | 8/2002 |
| DE | 10129818 A1 | 1/2003 |
| DE | 102004023739 A1 | 12/2005 |
| DE | 102008002770 A1 | 8/2009 |
| JP | 2232918 A | 9/1990 |

OTHER PUBLICATIONS

Blaesing, C., "Pattern Placement Metrology for Mask Making," SEMI, Mar. 31, 1998.

* cited by examiner

*Primary Examiner* — Sang Nguyen
(74) *Attorney, Agent, or Firm* — Patentbar International P.C.

(57) ABSTRACT

A method for determining the positions of structures (3) on a mask (2) is disclosed. The method is implemented in a metrology tool (1) comprising a measurement table (20) which is movable in X-coordinate direction and Y-coordinate direction. A first intensity profile ($I_X$) is recorded along a first measurement direction ($MR_X$), which is parallel to the X-coordinate direction. A second intensity profile ($I_Y$) is recorded along a second measurement direction ($MR_Y$), which is parallel to the Y-coordinate direction. A two-dimensional position of a centre of gravity (S) with respect to the coordinate system of the metrology tool (1) is determined from the first intensity profile ($I_X$) and the second intensity profile ($I_Y$).

11 Claims, 7 Drawing Sheets

METHOD FOR DETERMINING POSITIONS OF STRUCTURES ON A MASK

RELATED APPLICATIONS

This application claims priority to German Patent Application No. 10 2009 003 551.6, filed on Feb. 28, 2009, which is incorporated herein by reference in its entirety.

FIELD OF THE INVENTION

The present invention relates to a method for determining the positions of structures on a mask.

BACKGROUND OF THE INVENTION

The method according to the invention is implemented in a metrology tool. The metrology tool comprises a measurement table which is movable in X-coordinate direction and in Y-coordinate direction, on which a mask is placed which exhibits the structures to be measured.

A metrology tool is well known in the state of the art. For instance, reference is made to the manuscript of the presentation "Pattern Placement Metrology for Mask Making" by Dr. Carola Bläsing. The presentation was given at the conference Semicon, Education Program in Geneva, on Mar. 31, 1998, and therein a metrology tool was described in detail. The setup of a metrology tool according to the state of the art is described below in the context of FIG. 1. A method and a measurement tool for determining the positions of structures on a substrate is disclosed in the German patent application DE 100 47 211 A1. For details of the mentioned determination of the positions of structures on a mask reference is therefore expressly made to this document.

The German patent DE 101 29 818 B4 relates to a method for reading data from a detection chip of an electronic camera in a metrology tool for determining the position of an edge of a structure on a substrate, with at least two digitizers reading from the detection chip, where to each digitizer are assigned individual pixels of the detection chip, and wherein for the extraction of characteristic measurement parameters the digitized data read from the digitizers are subject to a data reduction process. The aim of the method is to compare the image data of a large image-format camera including at a high reading rate at the computing power of essentially a fast personal computer and to extract characteristic measurement parameters if necessary. The method for reading data from the detection chip of a camera is characterized in that the comparison of the reduced digitized data of the different digitizers involves a correction function.

The German patent application DE 10 2008 002 770 A1 discloses a method for determining the positions of periodic structures on a substrate. In the method a metrology tool is used, comprising a measurement table which is movable in X-coordinate direction and in Y-coordinate direction. Based on measured images and/or measured intensity profiles and on calculated or adapted intensity profiles the positions of periodic structures on a substrate are determined.

The Japanese patent application JP 2232918 A1 discloses a position detector for the reduction of errors in the position measurement of alignment marks on a mask. The mask is rastered along a coordinate direction with a spot of light.

The US patent application US 2003/201404 A1 discloses a method for detecting the position of a structure (mark) on a substrate. The structure is a lattice structure with a small lattice constant. The light is incident on the structure under an angle. An attempt is made to determine the position of the structures from the recorded diffraction signal.

The U.S. Pat. No. 5,572,288 discloses an exposure system for imaging the structures present on masks onto the surface of a wafer. An optical alignment system is provided which determines the alignment from marks.

A metrology tool is furthermore known from a plurality of patent applications, like for example DE 198 58 428, DE 101 06 699, or DE 10 2004 023 739. All documents of the state of the art listed here describe a metrology tool that allows to measure structures on a substrate. The substrate is placed on a measurement table which is movable in X-coordinate and in Y-coordinate direction. The metrology tool is constructed in such a way that the positions of structures or of edges of structures, respectively, are determined with an objective. For determining the positions of the structures or of their edges, respectively, the position of the measurement table needs to be determined with at least one interferometer. Finally the position of the edge is determined with respect to a coordinate system of the metrology tool.

Up to now all scanning algorithms of position metrology rested on the assumption that the object (structure) to be measured, at least within the area of the measurement window, does not change in the direction orthogonal to the measurement direction. In the case of the documents mentioned above (JP 2232918; U.S. Pat. No. 5,572,288; US2003/201404) a spot of light is moved over the edges of the structures along the measurement direction. In the documents DE 100 47 211 B4, DE 101 29 818 B4 and DE 10 2008 002 770 A1 the image information is averaged in the direction orthogonal to the measurement direction. In both cases no information regarding changes of the structures along a direction orthogonal to the measurement direction explicitly enters the scanning algorithm.

More recent mask technologies use increasingly smaller and finer structured objects (miniaturisation, OPC, double patterning). These are imaged with a diffuse edge due to the limited resolution of real optical systems. Therefore frequently one has to deal with structures where no edge sections which don't change in a direction orthogonal to the measurement direction can be found, so that known algorithms record the mean value of a curved edge. These results can be interpreted only with difficulty and indirectly; also often the result depends sensitively on the position of the measurement window.

SUMMARY OF THE INVENTION

The object of the present invention is to provide a method for reliably determining the position of small and/or irregular structures on a substrate or a mask, respectively.

The above object is achieved by the method for determining the position of structures on a mask, where the method is implemented with a metrology tool with a measurement table which is movable in X-coordinate direction and in Y-coordinate direction, comprising the following steps:
  a. defining a measurement window on a detector element of a camera of the metrology tool, wherein the detector element comprises a plurality of pixels arranged in rows and columns;
  b. positioning of the measurement table in the X-coordinate direction and in the Y-coordinate direction in such a way that a measurement objective of the metrology tool images at least a part of the respective structure to be measured into the measurement window of the detector element;

c. recording a first intensity profile along a first measurement direction, which is parallel to the X-coordinate direction;

d. recording a second intensity profile along a second measurement direction, which is parallel to the Y-coordinate direction;

e. determining a two-dimensional position of a centre of gravity with respect to a coordinate system of the metrology tool from the first intensity profile and the second intensity profile; and f. determining, based on the position of the centre of gravity, the positions of edges of the structure which are essentially orthogonal to the first measurement direction and the positions of edges of the structure which are essentially orthogonal to the second measurement direction.

It is obvious to a person skilled in the art that the restriction of the description to one-dimensional intensity profiles is only made for the sake of simplification of the description.

In the method according to the invention first a measurement window is defined on a detector element of a camera of the metrology tool. The detector element comprises a plurality of pixels arranged in rows and columns. The measurement table is positioned in the X-coordinate direction and in the Y-coordinate direction in such a way that a measurement objective of the metrology tool images at least a part of the respective structure to be measured into the measurement window of the detector element.

A first intensity profile is recorded along a first measurement direction, which is parallel to the X-coordinate direction. A second intensity profile is recorded along a second measurement direction, which is parallel to the Y-coordinate direction. A two-dimensional position of a centre of gravity is determined with respect to the coordinate system of the metrology tool from the first intensity profile and the second intensity profile. Based on the position of the centre of gravity, the positions of edges of the structure which are essentially orthogonal to the first measurement direction are determined. Likewise the positions of edges of the structure which are essentially orthogonal to the second measurement direction are determined.

The combination of the first and the second intensity profiles of the image of the structure recorded from the measurement window defined in the detector element represents a function of two variables. For the calculation of the position of the centre of gravity a delimited object is defined, which results from the intersection of a plane representing a threshold of constant brightness with the recorded two-dimensional intensity profile.

For a metrologically useful algorithm the value of the threshold refers to image brightness, wherein the value of the threshold is expressed as a fraction of the difference in brightness between a brightness level with the highest brightness value and a brightness level with the lowest brightness value in the image of the structure. For the calculation the pixel values from within the measurement window are used, and a histogram is calculated from these pixel values.

For small structures a minimum and/or a maximum of the brightness of the image image of the recorded structure is calculated. For the calculation of the maximum and/or minimum a parabola ($p(x)=ax^2+bx+c$) is fitted to the data points of the intensity profile in the vicinity of the extremal value.

As an intermediate step a pseudo-profile $P_k$ is determined, which based on a positional increment $\Delta_P$ along the first measurement direction and/or second measurement direction provides intensity values for the positions $p_k=k \cdot \Delta_P$, where $k=0, 1, 2, \ldots, K-1$. The contributions of the pixels to the integral for each element of the surface of the object are distributed between those two profile channels which are closest to the location of the pixel with respect to the first measurement direction and/or the second measurement direction.

The position of the centre of gravity in the first measurement direction is determined from the positions of the edges of the structure which are essentially orthogonal to the first measurement direction. The position of the centre of gravity in the second measurement direction is determined from the positions of the edges of the structure which are essentially orthogonal to the second measurement direction.

For a structure of regular shape the line width is determined from the difference of the positions of two parallel edges in the first measurement direction or in the second measurement direction, respectively. For a structure of irregular shape the linewidth is calculated from the mean distance from the centre of gravity in the first measurement direction or in the second measurement direction. Thus a standard deviation of the profile position arises.

The centre of gravity of several structures is obtained as a weighted average of the centres of gravity of the individual structures, wherein the weight for each individual structure is a volume of the respective individual structure.

The above and other features of the invention including various novel details of construction and combinations of parts, and other advantages, will now be more particularly described with reference to the accompanying drawings and pointed out in the claims. It will be understood that the particular method and device embodying the invention are shown by way of way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
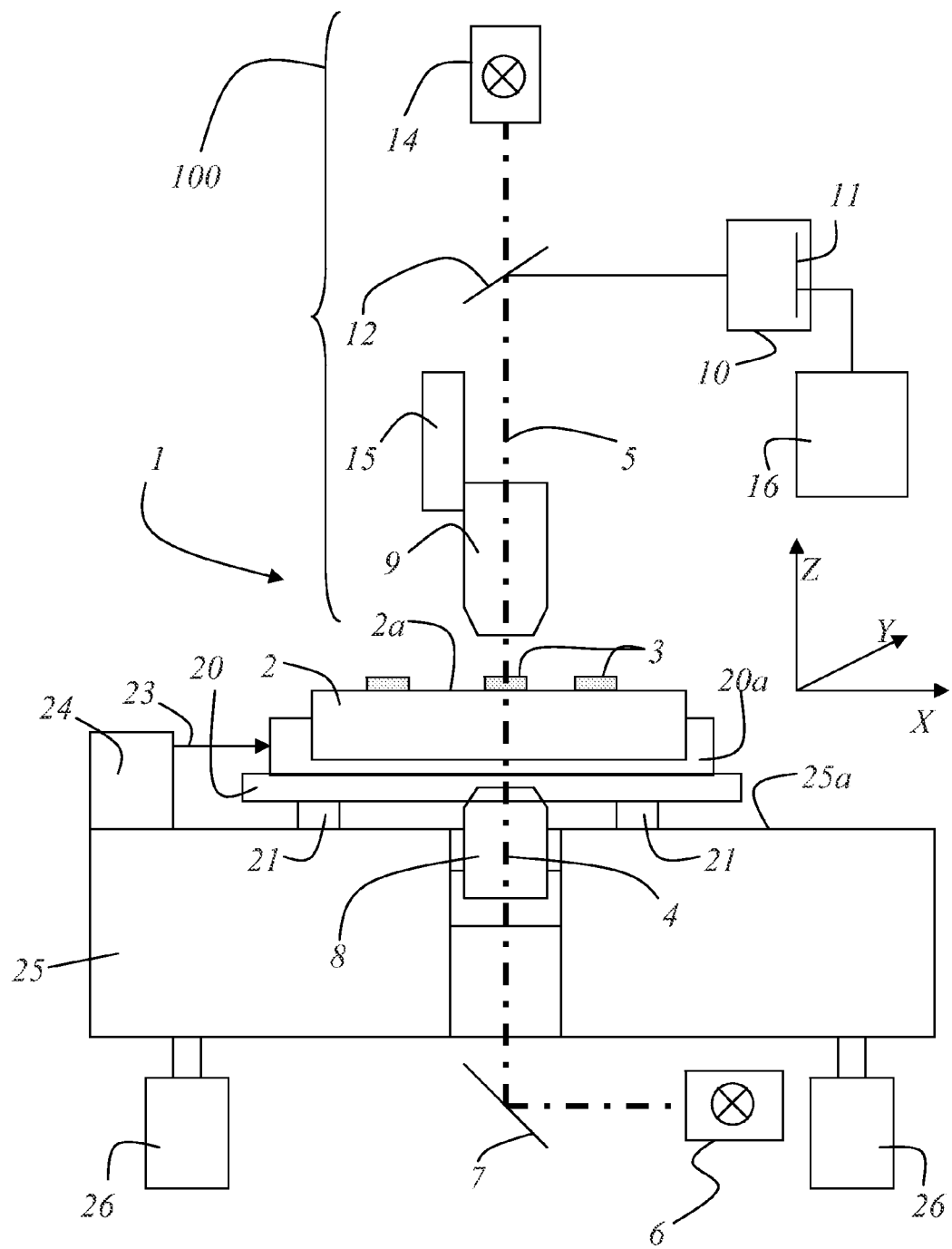
FIG. 1 schematically shows a metrology tool as it has been in use for determining the positions and the width of structures on a substrate (mask) for some time.

A metrology tool of the type shown in FIG. 1 already has been described in detail in the state of the art and is used for carrying out the method according to the invention. The metrology tool 1 comprises a measurement table 20 which is movable in the X-coordinate direction and in the Y-coordinate direction. The measurement table 20 holds a substrate or a mask, respectively, for the production of a semiconductor device. A surface of the substrate 2 exhibits several structures 3. The measurement table 20 rests on air bearings 21 which in turn rest on a block 25. The air bearings 21 described herein constitute one possible embodiment and shall not be construed as a limitation of the invention. The block 25 is, for example, made of granite. It is obvious to a person skilled in the art that the block 25 can consist of any material which is suitable for forming a plane 25a in which the measurement table 20 moves or is positioned. For illuminating the substrate 2 at least one top-light illumination system 14, and/or one transmission illumination system 6 are provided. In the embodiment shown the light from the transmission illumination system 6 is coupled into the illumination axis 4 for transmitted light by the mirror 7. The light from the transmission illumination system 6 reaches the substrate 2 through a condenser 8. The light from the top-light illumination system 14 reaches the substrate 2 through the measurement objective 9. The light from the substrate 2 is collected by the measurement objective 9 and is directed out of the optical axis 5 by a beam splitter 12. The measurement light reaches the camera 10, which exhibits a detector element 11. A computation unit 16 is assigned to the detector element 11, which generates digital images from the recorded data.

The position of the measurement table 20 is measured and determined with a laser interferometer 24. For this purpose, the laser interferometer 24 emits a measurement light beam 23. The measurement objective 9 is connected with a displacement system in Z-coordinate direction, so that the measurement objective can focus on the surface of the substrate 2. The position of the measurement objective 9 can for example be measured with a glass scale (not shown). The block 25 furthermore rests on legs 26 which exhibit vibration damping. The purpose of the vibration damping is to reduce or eliminate as far as possible vibrations of the metrology tool itself and of the building housing the metrology tool.

Figure 2:
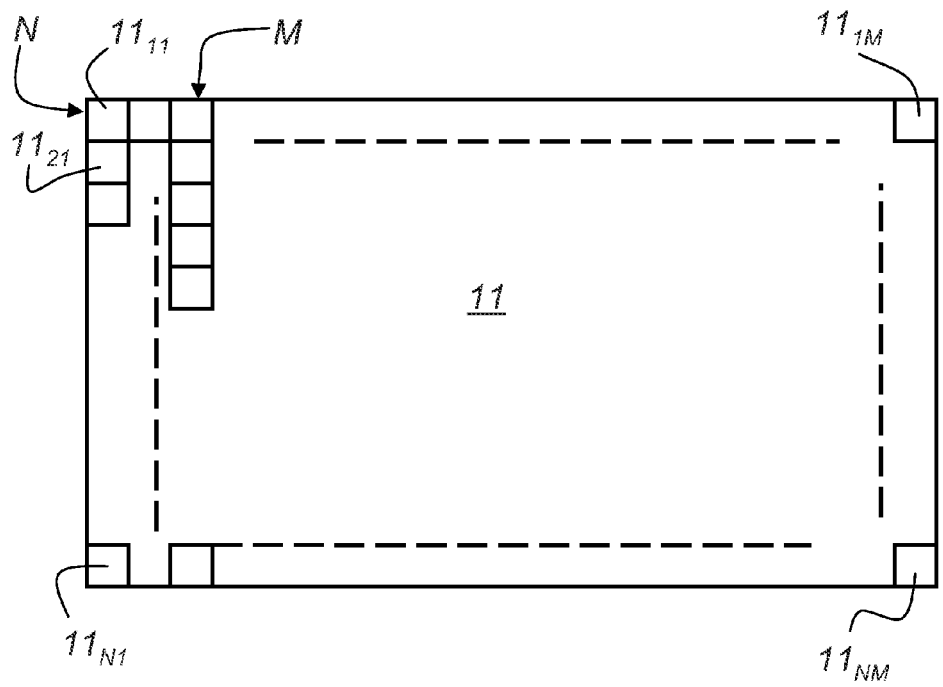
FIG. 2 schematically shows a detector element of a camera.

FIG. 2 shows a schematic representation of the detector element 11 of the camera 10. The detector element 11 consists of a plurality of pixels $11_{11}$, $11_{12}$, ..., $11_{NM}$, which are arranged in rows N and columns M. A measurement window 30 is defined on the detector element 11, into which the structure 3 to be measured is imaged with the measurement objective 9 of the metrology tool 1. By means of the measurement window 30 the positions along the first measurement direction $MR_X$ of the first edge $3K_1$ of the structure 3 and of the second edge $3K_2$ of the structure 3 are determined. Likewise by means of the measurement window 30 the positions along the second measurement direction $MR_Y$ of the first edge $3K_3$ of the structure 3 and of the second edge $3K_4$ of the structure 3 are determined (see FIG. 3 and FIG. 4).

Figure 3:
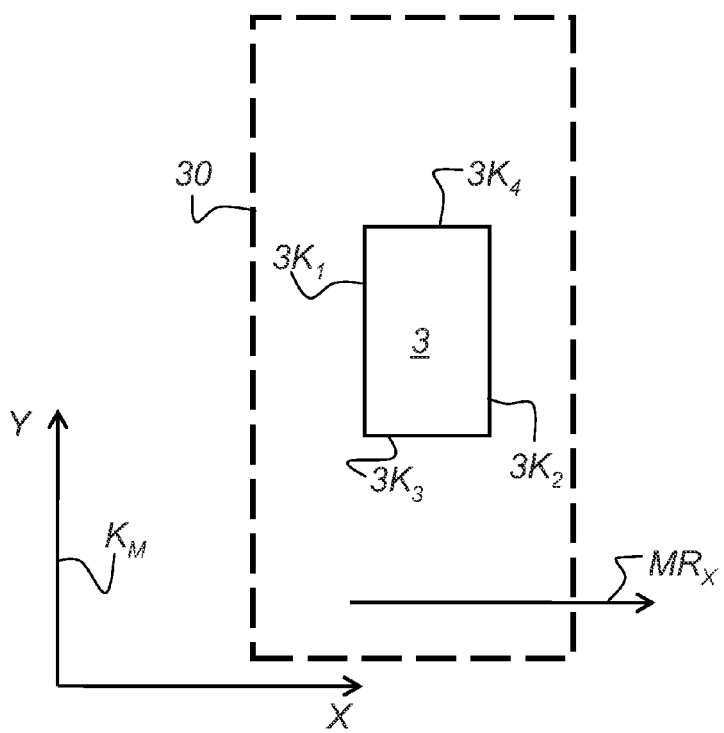
FIG. 3 shows the assignment of a measurement window to a structure to be measured, wherein the measurement direction is parallel to the X-coordinate direction.
Figure 4:
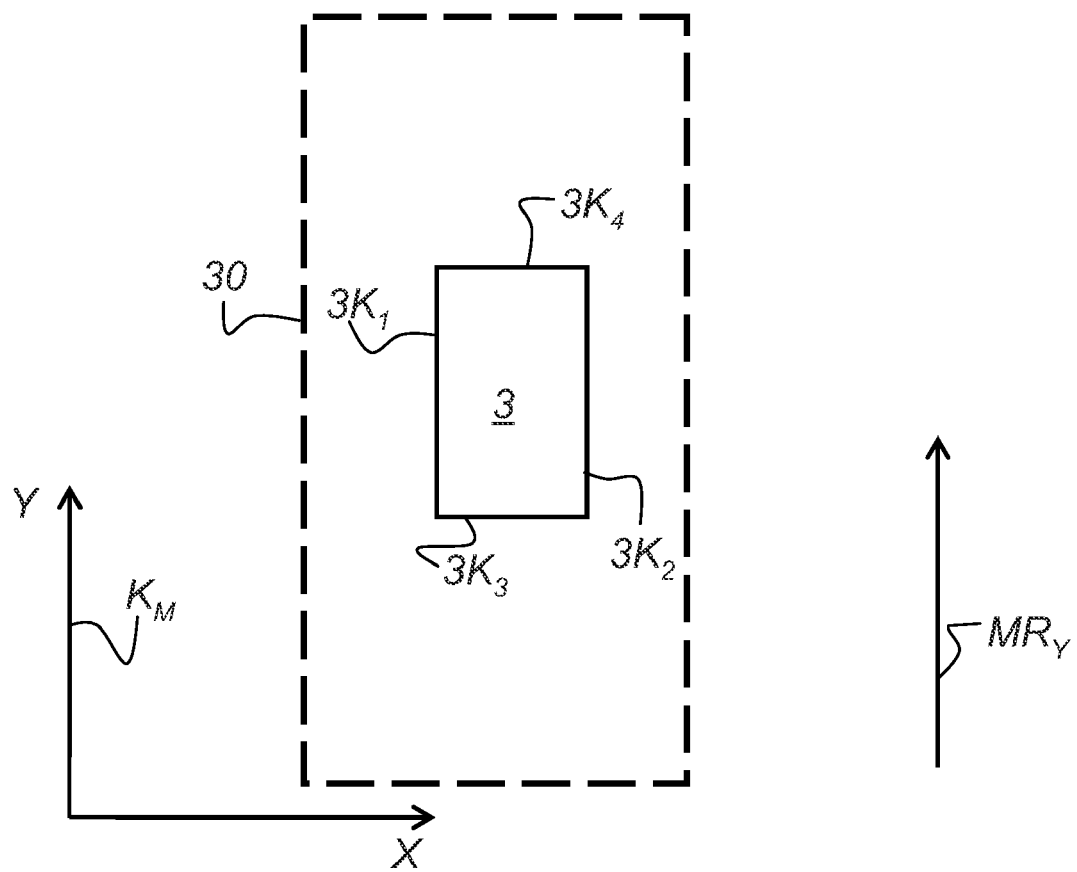
FIG. 4 shows the assignment of a measurement window to a structure to be measured, wherein the measurement direction is parallel to the Y-coordinate direction.

FIG. 3 shows the measurement principle for determining the positions of the edges $3K_1$ and $3K_2$ of the structure 3 in the first measurement direction $MR_X$. FIG. 4 shows the measurement principle for determining the positions of the edges $3K_3$ and $3K_4$ of the structure 3 in the second measurement direction $MR_Y$. The positions of the edges are determined with respect to the coordinate system $K_M$ of the metrology tool 1.

Figure 5:
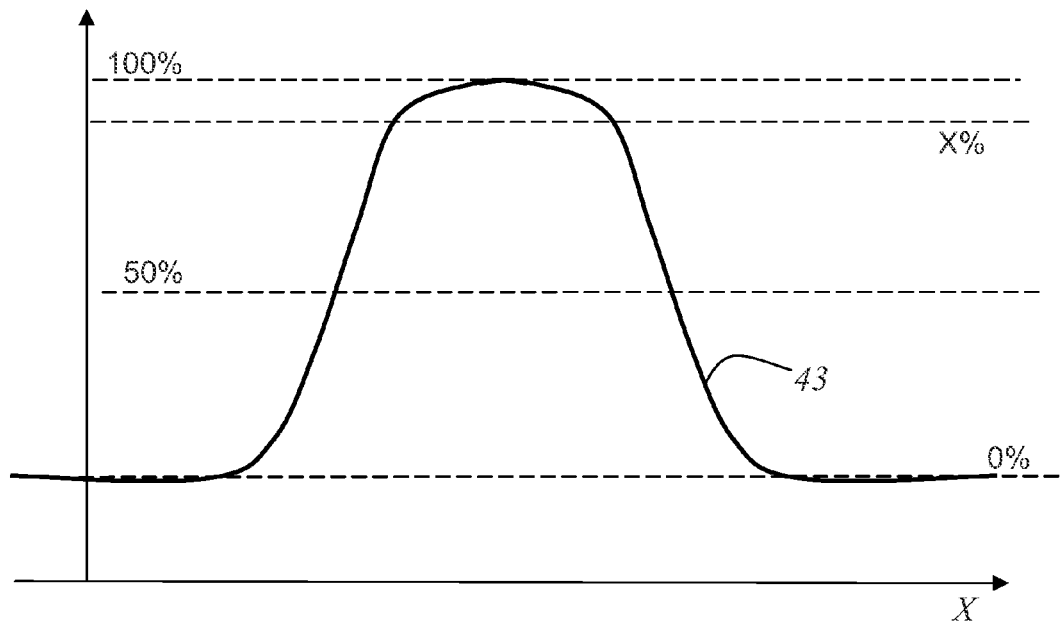
FIG. 5 shows the intensity distribution for a structure as recorded in the measurement window of the detector element, wherein the measurement direction is the X-coordinate direction.
Figure 5:
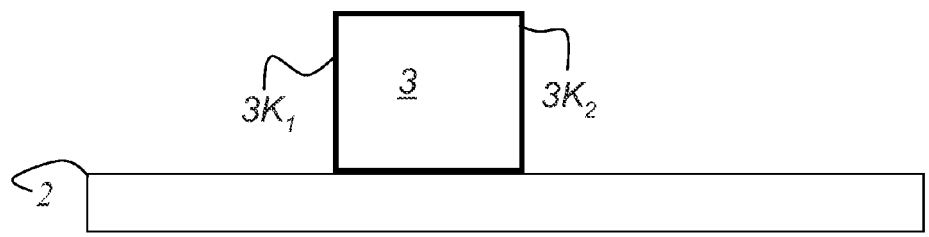
Figure 6:
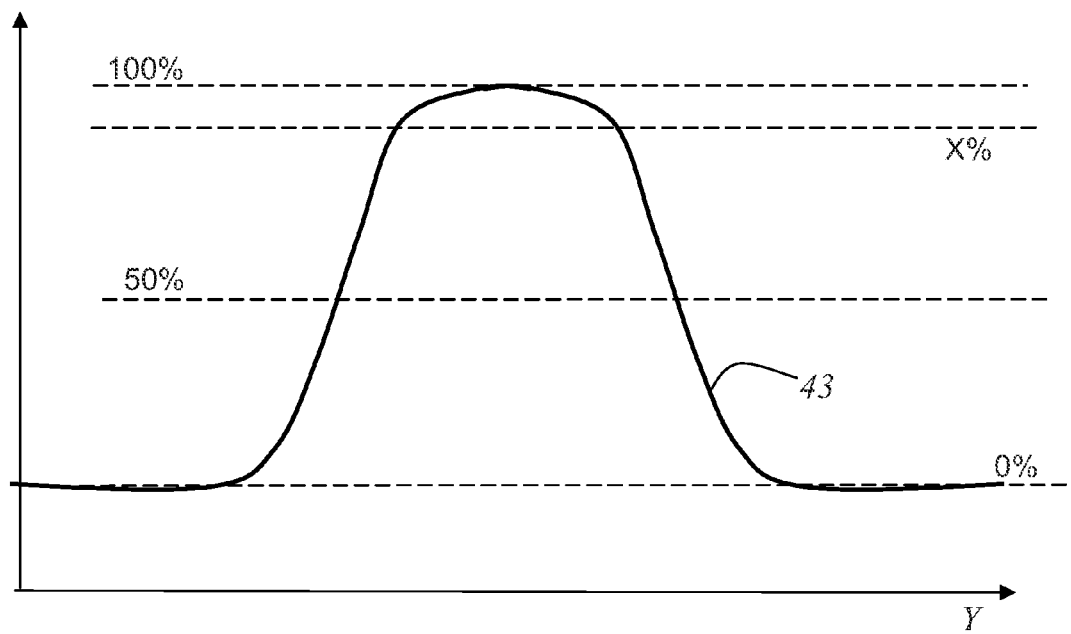
FIG. 6 shows the intensity distribution for a structure as recorded in the measurement window of the detector element, wherein the measurement direction is the Y-coordinate direction.
Figure 6:
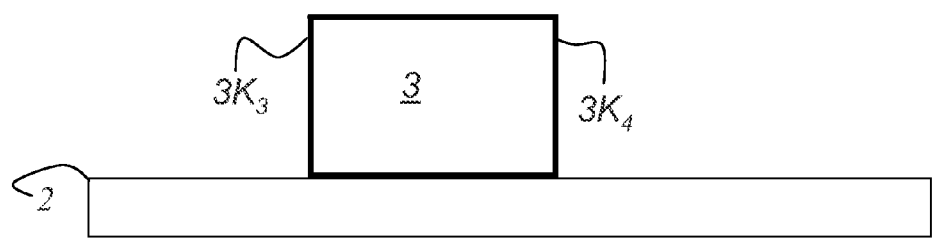

FIG. 5 schematically shows a recorded intensity profile 43 from the structure 3 imaged into the measurement window 30. The measurement direction $MR_X$ is in X-coordinate direction. FIG. 6 schematically shows a recorded intensity profile 43 from the structure 3 imaged into the measurement window 30. The measurement direction $MR_Y$ is in Y-coordinate direction.

Figure 7:
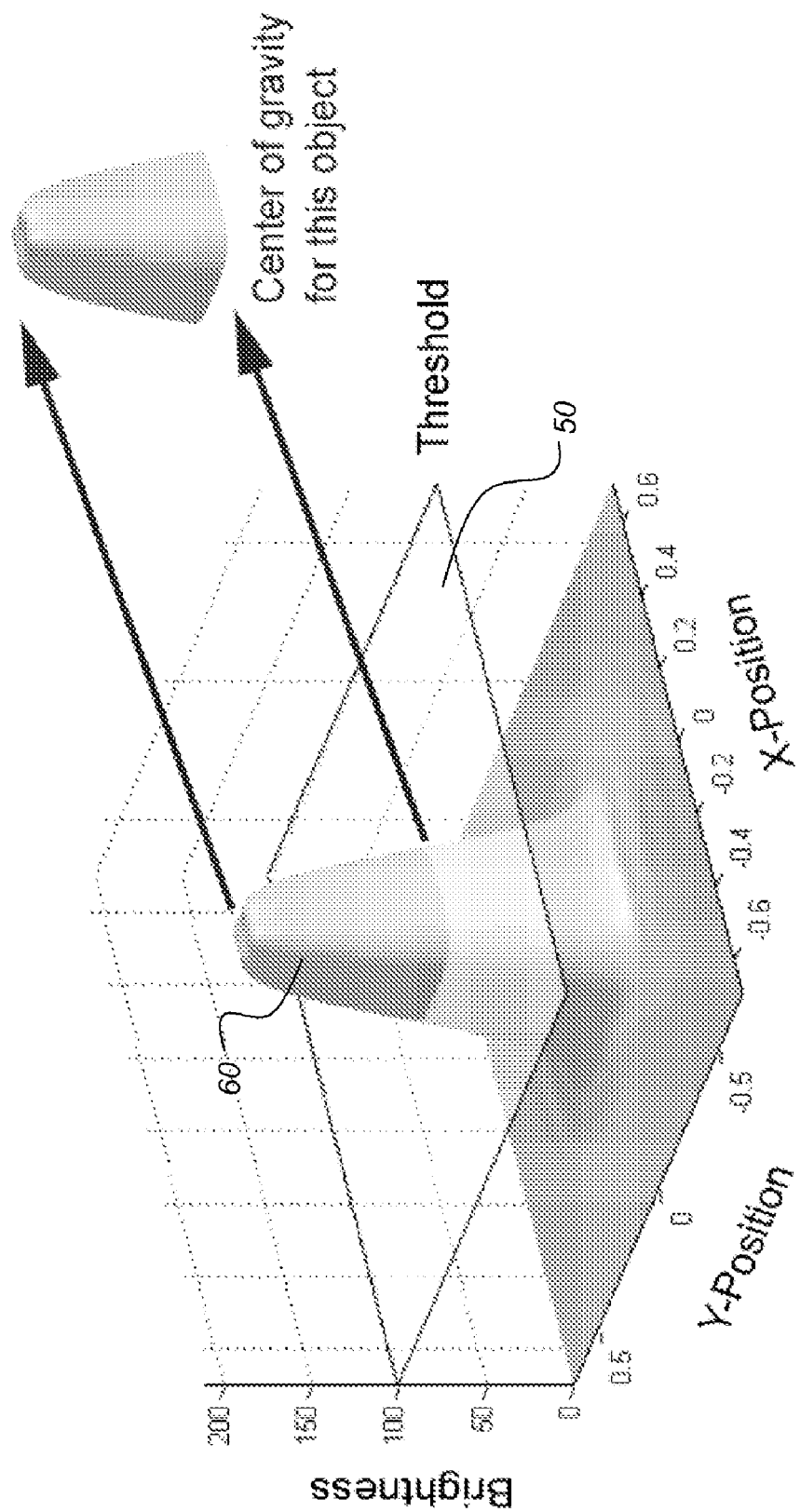
FIG. 7 illustrates the principle of the centre of gravity calculation.

FIG. 7 illustrates the principle of the centre of gravity calculation. The intensity of light in the image of the measurement window 30 is determined as a function of two variables I(x,y) (X- and Y-position).

The basic idea of the invention is that a delimited object or delimited structure is obtained by intersecting this brightness function with a plane corresponding to a constant brightness value. This plane 50 is referred to as threshold in what follows.

The horizontal position of the centre of gravity ($x_S$, $y_S$) of this object is calculated. The fundamental algorithms for calculating the centre of gravity are of course well known:

$$x_S = \frac{1}{V}\int_V x\,dV \text{ und } y_S = \frac{1}{V}\int_V y\,dV \qquad \text{(Eq. 1)}$$

In principle the method is to be applied both in the case of bright structures before a dark background (for example chrome surfaces in top-light) and in the case of dark structures before a bright background (for example chrome surfaces in transmitted light). The delimited object therefore is the volume above the threshold in the case of a bright object, and the volume below the threshold in the case of a dark object. If in the following bright objects are used for the description and drawings, the alternative of dark objects is understood to be included.

The equation (1) for the case of two-dimensional delimited problems (base F) takes the form $$x_S = \frac{1}{V}\int_F x I(x,y)\,dxdy \text{ and } y_S = \frac{1}{V}\int_F y I(x,y)\,dxdy \qquad \text{(Eq. 2)}$$

where $$V = \int_F I(x,y)\,dxdy \qquad \text{(Eq. 3)}$$

In reality a continuous intensity function is not obtained as result of a measurement (image recording). The intensity is only known at discrete points (usually a pixel grid). The integral therefore has to be evaluated with the methods of numerical mathematics. One possible method for example is the linear approximation in connection with the generalisation of the trapezoid formula.

The integral of a triangular area element of size $F_i$ is in this approximation for the components i of V, $x_S$ and $y_S$ $$V_i \approx F_i \cdot \frac{1}{3}\sum_{j=1}^{3} I_{ij} \qquad \text{(Eq. 4)}$$

$$x_{Si} \approx F_i \cdot \frac{1}{3}\sum_{j=1}^{3} x_{ij} I_{ij} \text{ and}$$

$$y_{Si} \approx F_i \cdot \frac{1}{3}\sum_{j=1}^{3} y_{ij} I_{ij}$$

Here j runs over the corners of the triangle, and in order to obtain the total result, the components are to be summed over i.

The surface in the x-y plane is divided into triangles the corners of which are pixels (in the interior of the surface) or intersection points of the surface boundary with lines connecting adjacent pixels. The boundary is determined by linear interpolation.

The threshold value (brightness or intensity value of the intersecting plane 50) in a metrologically useful algorithms is based on image brightness. The threshold for example could be specified as a fraction of the difference in brightness between the brightness levels of the bright (100% level) and the dark (0% level) regions in the image. The threshold value can be determined in complete analogy to the previous mask algorithm. For this purpose a histogram is calculated not like previously from profile values but from pixel values within the measurement window 30. From there the 0% and 100% levels are calculated as before.

In the case of small objects, for which the histogram method does not provide a satisfactory determination of the levels, minimum and/or maximum of the image brightness are calculated. To this end up to now the maximum of a parabola ($p(x)=ax^2+bx+c$) fitted to the profile points $I_{m-k}, I_{m-k+1}, \ldots, I_m, \ldots, I_{m+k-1}, I_{m+k}$ in the vicinity of the extremal value (close to profile channel m) was determined. This method can easily be generalized to the two-dimensional case of a pixel grid:

Parabolic function: $p(x,y)=ax^2+bxy+cy^2+dx+ey+f$ through intensity values:

$$\begin{matrix} I_{m-k,n-k} & \cdots & I_{m-k,n} & \cdots & I_{m-k,n+k} \\ \vdots & \ddots & \vdots & \cdot^{\cdot^{\cdot}} & \vdots \\ I_{m,n-k} & \cdots & I_{m,n} & \cdots & I_{m,n+k} \\ \vdots & \cdot^{\cdot^{\cdot}} & \vdots & \ddots & \vdots \\ I_{m+k,n-k} & \cdots & I_{m+k,n} & \cdots & I_{m+k,n+k} \end{matrix}$$

The extremal value of the fitted parabolic function is determined with known mathematical methods as position of the zeroes of the derivatives in x- and in y-direction.

Figure 8:
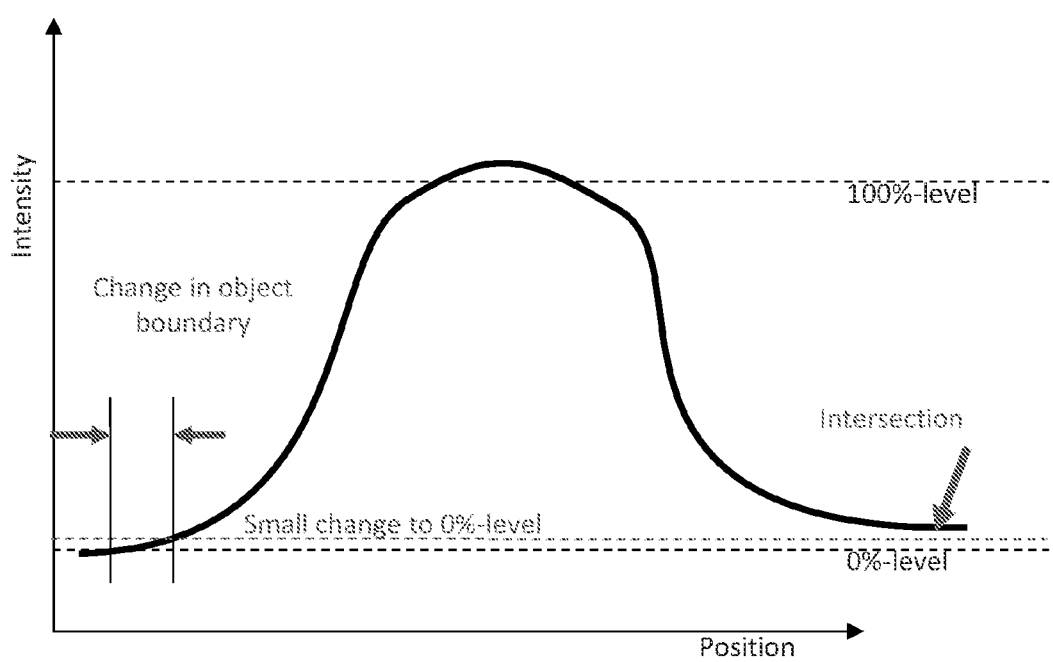
FIG. 8 shows possible difficulties with thresholds close to the 0% or 100% levels.

FIG. 8 shows the difficulties in determining the intersection of the threshold 50 with the intensity profile 60. A useful extension of the algorithm is to conduct the measurement with a threshold of 0% in the case of bright structures and a threshold of 100% in the case of dark structures; only then the entire object is taken into account. In reality this is not feasible as due to non-ideal measurement devices the 0% level cannot be reached in some regions of the image, if the measurement is carried out at very high precision.

Nor is the method mathematically very stable, because small changes of the level lead to large changes of the object dimensions. The object area is only well-defined at a certain distance from the 0% and the 100% levels.

It is however possible to determine the position of the centre of gravity at a fictitious 0%/100% threshold without really having carried out the measurement with these thresholds. For this, the method of extrapolation is used. For a bright object this could work for example as follows:

determining a position of the centre of gravity ($x_{s1}, y_{s1}$) for a very small, but just about feasible threshold $s_1 = s_{0\%} + \Delta$;

calculating further positions of the centre of gravity ($x_{si}, y_{si}$) for further, higher thresholds, for example at multiples of $\Delta$, $s_i = s_{0\%} + i\Delta$; and extrapolating the positions of the respective centres of gravity to the value ($x_{s0\%}, y_{s0\%}$) corresponding to the in reality not feasible threshold $s_{0\%}$.

Extrapolation in short: A suitable function is fitted to the known data points ($i, x_{si}$) and ($i, y_{si}$), respectively. The extrapolated value is the value of the fitted function outside the region of the known data points, in our case at i=0.

In order to integrate the centre of gravity algorithm into the existing software structure of the metrology tool, the algorithm sketched above is modified in some points.

A measurement can be carried out in an arbitrarily oriented measurement direction. For the two-dimensional integration the boundary of the object (intersection with the threshold) needs to be determined only once. The two-dimensional position of the centre of gravity can be determined with equation (2). For reasons of compatibility in one measurement window only one coordinate of the centre of gravity in one (arbitrary) measurement direction is determined. The second coordinate of the centre of gravity is determined based on a second measurement window, independently of the determination of the first coordinate.

As an intermediate step a profile calculation is carried out and a pseudo-profile $P_k$ is obtained. It is meant to provide values of the intensity at positions $p_k = k\Delta_P$, with k=0, 1, 2, ..., K−1, and $\Delta_P$ a positional increment in the measurement direction. The contributions of pixel $p_{ij}$ to the integral for each element of the surface of the object are distributed between those two profile channels which are closest to the position of the pixel in the measurement direction. Thus the equation (4) is to be determined as $$V \approx \sum_{k=0}^{K-1} P_k \text{ and } x_S \approx \sum_{k=0}^{K-1} k \cdot P_k$$

For this section $x_s$ is interpreted a position of the centre of gravity in the measurement direction.

Mathematically this leads to the following calculation:

Let $x_p$ be the position in the measurement direction of pixel P with a contribution to the integral $A_p$. $x_p$ in general will not coincide with a profile channel $p_k$. Let $P_l$ and $P_{l+1}$ be the two profile channels close-by, with positions $p_l$ and $p_{l+1}$. Then we calculate $$a_0 = \frac{x_p - p_l}{\Delta_p} \text{ and } a_1 = \frac{p_{l+1} - x_p}{\Delta_p}$$

Now the profile channels l and l+1 are incremented:

$$P_l = P_l + a_1 \cdot A_p \text{ and } P_{l+1} = P_{l+1} + a_0 \cdot A_p$$

The software implementing the algorithm internally works with edge positions (first and second edges $3K_1$ and $3K_2$ orthogonal to the first measurement direction $MR_x$), and determines a position as $X_S = (K_1 + K_2)/2$. Here always a calculation of the line width is possible, too, yielding as a result $CD = K_2 - K_1$.

In the case of an object of irregular shape the most suitable value for a line width is obtained from the mean distance (along the measurement direction) from the centre of gravity. This leads to a standard deviation of the profile position $$\sigma = \sqrt{\frac{\sum_{k=0}^{K-1} P_k (k \cdot \Delta_P - x_S)^2}{\sum_{k=0}^{K-1} P_k}}$$

and the relations $$K_1 = x_S - \sigma \text{ and } K_2 = x_S + \sigma$$

If one is interested in the common centre of gravity of several objects, it is not correct to take the average of the centres of gravity of the individual objects. The centres of gravity have to be weighted with the volumes $V_n$ (volumes according to equation (4)) of the individual objects:

$$\bar{x}_S = \frac{\sum_{n=1}^{N} V_n \cdot x_{Sn}}{\sum_{n=1}^{N} V_n}$$

The volumes can be quickly calculated from the pseudo profiles, they only need to be stored in the data structure for later evaluation.

While this invention has been particularly shown and described with references to preferred embodiments thereof, it will be understood by those skilled in the art that various changes in form and details may be made therein without departing from the scope of the invention encompassed by the appended claims.

What is claimed is:

1. Method for determining a position of structures on a mask comprising the following steps:
    a. providing a metrology tool with a measurement table which is movable in an X-coordinate direction and in an Y-coordinate direction, and a computation unit assigned to a detector element of a camera;
    b. defining a measurement window on the detector element of the metrology tool, wherein the detector element comprises a plurality of pixels arranged in rows and columns;
    c. positioning of the measurement table in the X-coordinate direction and in the Y-coordinate direction in such a way that a measurement objective of the metrology tool images at least a part of a respective structure to be measured into the measurement window of the detector element;
    d. recording a first intensity profile along a first measurement direction, which is parallel to the X-coordinate direction and recording a second intensity profile along a second measurement direction, which is parallel to the Y-coordinate direction; and
    e. combining the first and the second intensity profiles representing a function of two variables of the image of the structure recorded from the measurement window defined in the detector element;
    f. integrating a centre of gravity algorithm into an existing software structure of the metrology tool for determining a two-dimensional position of a centre of gravity with respect to a coordinate system of the metrology tool from the first intensity profile and the second intensity profile and for determining, based on the position of the centre of gravity, the positions of edges of the structure which are essentially orthogonal to the first measurement direction and the positions of edges of the structure on the mask which are essentially orthogonal to the second measurement direction.

2. The method of claim 1, wherein for the calculation of the position of the centre of gravity a delimited object is defined, which results from the intersection of a plane representing a threshold of constant brightness with the recorded two-dimensional intensity profile.

3. The method of claim 2, wherein for a metrologically useful algorithm the value of the threshold refers to image brightness, wherein the value of the threshold is expressed as a fraction of the difference in brightness between a brightness level with the highest brightness value and a brightness level with the lowest brightness value in the image of the structure.

4. The method of claim 2, wherein for the calculation the pixel values from within the measurement window are used, and wherein a histogram is calculated from these pixel values.

5. The method of claim 4, wherein for the calculation of the maximum and/or minimum a parabola ($p(x)=ax^2+bx+c$) is fitted to the data points of the intensity profile in the vicinity of the extremal value.

6. The method of claim 1, wherein for structures, for which a histogram does not provide a satisfactory determination of the levels, a minimum and/or a maximum of the brightness of the image of the recorded structure is calculated.

7. The method of claim 6, wherein as an intermediate step a pseudo-profile $P_k$ is determined, which, based on a positional increment $\Delta_P$ along the first measurement direction and/or second measurement direction, provides intensity values for the positions $p_k = k \cdot \Delta_P$, where $k = 0, 1, 2, \ldots, K-1$, and wherein the contributions of the pixels to the integral for each element of the surface of the object are distributed between those two profile channels which are closest to the location of the pixel with respect to the first measurement direction and/or the second measurement direction.

8. The method of claim 7, wherein for a structure of regular shape the line width is determined from the difference of the positions of two parallel edges in the first measurement direction or in the second measurement direction, respectively.

9. The method of claim 7, wherein for a structure of irregular shape the line width is calculated from the mean distance from the centre of gravity in the first measurement direction or in the second measurement direction, thus incurring a standard deviation of the profile position.

10. The method of claim 1, wherein the position of the centre of gravity in the first measurement direction is determined from the positions of the edges of the structure which are essentially orthogonal to the first measurement direction, and wherein the position of the centre of gravity in the second measurement direction is determined from the positions of the edges of the structure which are essentially orthogonal to the second measurement direction.

11. The method of claim 1, wherein the centre of gravity of several structures is obtained as a weighted average of the centres of gravity of the individual structures, wherein the weight for each individual structure is a volume of the respective individual structure.

* * * * *